United States Patent [19]
Hierholzer et al.

[11] 3,764,776
[45] Oct. 9, 1973

[54] METHOD OF MAKING COHERENT SHAPE OF SILICON CARBIDE

[75] Inventors: Frank J. Hierholzer, Florissant; John A. Ancona, St. Louis, both of Mo.

[73] Assignee: Emerson Electric Co., St. Louis, Mo.

[22] Filed: Feb. 28, 1972

[21] Appl. No.: 229,789

[52] U.S. Cl............... 219/121 LM, 264/25, 264/27, 264/61, 264/109
[51] Int. Cl............................................. B23k 27/00
[58] Field of Search................. 219/121 L, 121 CM; 264/125, 25, 61, 56, 57, 27, 109; 338/330

[56] References Cited
UNITED STATES PATENTS

| | | | |
|---|---|---|---|
| 1,906,963 | 5/1933 | Heyroth | 338/330 |
| 3,051,924 | 8/1962 | Amboro | 338/330 |
| 3,338,693 | 8/1967 | Letter | 219/121 LM |
| 3,432,296 | 3/1969 | McKinnon | 264/125 |

*Primary Examiner*—E. A. Goldberg
*Attorney*—Philip B. Polster et al.

[57] ABSTRACT

A coherent shape of silicon carbide is produced by heating particulate silicon carbide to a temperature above 3,000° F. and below 5,500° F. and subsequently cooling the silicon carbide below 3,000° F., both steps being completed within a period of 30 minutes. In the preferred method, the particulate silicon carbide is exposed to the energy of a laser beam, and the particulate silicon carbide has a minimum particle size greater than ten microns. The preferred shape has a core with a relatively low resistivity of the magnitude of the order of 0.05 to 100 ohms per linear inch and a distinctly delineated rind with a relatively high resistivity which may be removed if lower thermal mass is required by a specific application.

11 Claims, 4 Drawing Figures

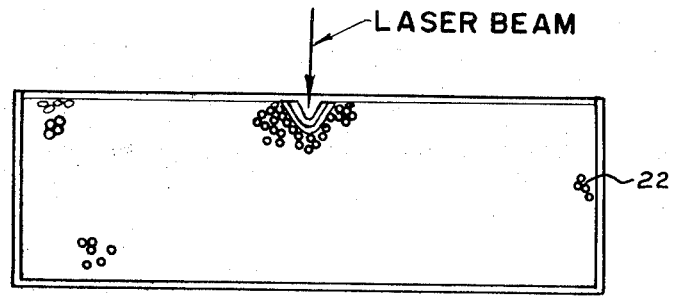
FIG. 1.
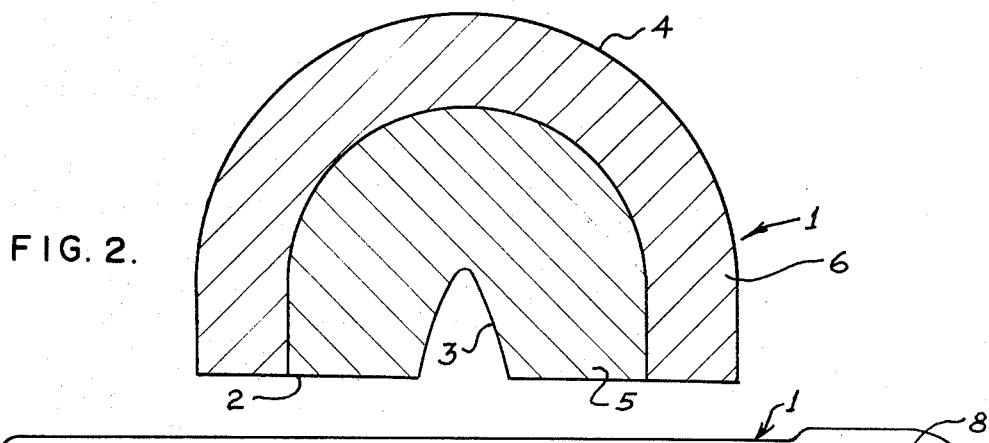
FIG. 2.
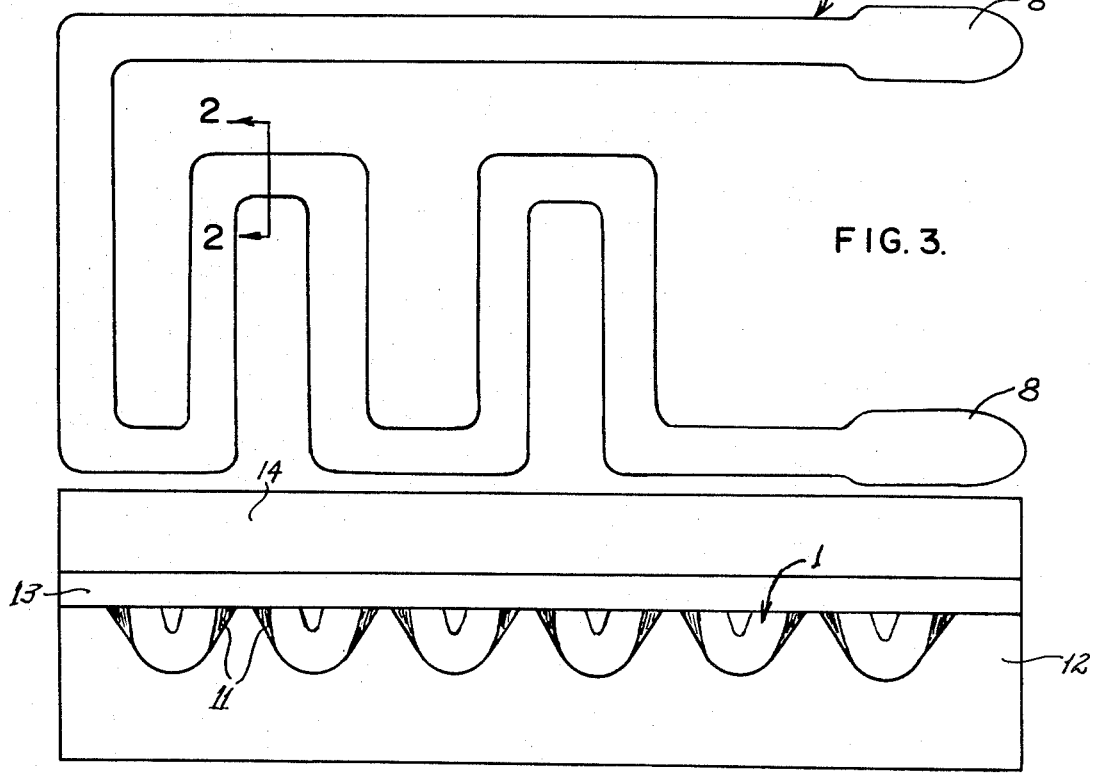
FIG. 3.
FIG. 4.

METHOD OF MAKING COHERENT SHAPE OF SILICON CARBIDE

BACKGROUND OF THE INVENTION

This invention has particular but not exclusive application to high temperature heating elements made of silicon carbide. More broadly, it relates to unique coherent silicon carbide shapes and a method of producing them. Silicon carbide rods are available commercially. One method for making them is by forming a rod of silicon carbide, silicon and carbon in the "green" or unfired state. The rods are packed in carbon and put in a furnace for sintering to lower the resistance of the rod. An example of such a method is set out in U. S. Pat. No. 2,897,572. The process requires a time span measured in hours, is cumbersome, expensive, and not adapted to the production of light and complicated shapes of precisely controlled resistance.

The preferred embodiments of shapes of this invention are made of doped silicon carbide, have a core with a relatively low resistivity and a distinctly delineated rind of high resistivity. They may be non-linear, of complicated shape, and with the various reaches of the top surface lying in substantially the same plane. As such they can be used in applications for which silicon carbide elements have never heretofore been used, such as range burner elements.

SUMMARY OF THE INVENTION

In accordance with this invention, generally stated, a coherent shape of silicon carbide is produced by heating particulate silicon carbide to a temperature above 3,000° F. and below 5,500° F. and subsequently cooling the silicon carbide below 3,000° F., both steps being completed within a period of 30 minutes.

In the preferred method, unconsolidated particulate silicon carbide with a minimum particle size greater than 10 microns and a maximum particle size less than 300 microns is exposed to the energy of a carbon dioxide laser beam with a wave length of approximately 10.6 microns in a predetermined pattern and at a rate such that none of the silicon carbide particles is exposed to the beam more than 30 seconds. The silicon carbide is preferably doped with a p-type dopant such as aluminum although it may be doped with an n-type dopant such as nitrogen. The shape which results from this preferred method is coherent, has a core with a relatively low resistivity and a distinctly delineated, adhered but removable rind of silicon carbide of high resistivity. If the laser beam is directed to the surface of a flat bed of particulate silicon carbide, the upper surface of the resulting shape will reflect the surface of the bed and lie in substantially a single plane. The upper surface of the shape will have a valley in it, symmetrically placed with respect to the core and rind. By slowing the rate of movement of the bed and laser beam relative to one another, at the ends of the shape, a section of enlarged cross-sectional area can be produced. When the shape is used as a heating element, the enlarged sections provide for a cooler terminal connection than would be available if the shape were of uniform cross-sectional area from one end to the other. The cross-section can also be varied by changing beam spot size or laser power.

BRIEF DESCRIPTION OF THE DRAWING

In the drawing,

FIG. 1 is a somewhat schematic view of a bed of particulate silicon carbide upon which a laser beam is impinging to form a shape of this invention;

FIG. 2 is a greatly enlarged sectional view taken along the line 2—2 of FIG. 3, of a shape of this invention;

FIG. 3 is a bottom plane view of one embodiment of shape of this invention; and

FIG. 4 is a sectional view of a shape of this invention mounted to function as a heating element for a domestic range or the like.

DESCRIPTION OF THE PREFERRED EMBODIMENT

Referring now to the drawing, and particularly to FIGS. 2 and 3, reference numeral 1 indicates one embodiment of shape of this invention, designed to be used as an electric heating element. The shape 1 is made of silicon carbide. In the preferred embodiment shown, the shape is substantially flat on its upper surface 2, except for a valley or groove 3 at its center, and is transversely arcuate on its outer surface 4. The element 1 has a clearly delineated core 5 and rind 6. The groove 3 runs the length of the shape, in the core 5. The core 5 has a low resistivity compared with the rind 6. The rind 6, in the preferred embodiment, adheres to the core 5, but is separable from it.

Referring now to FIG. 3, the shape 1 is made with an enlarged end section 8 at its end, to provide relatively cool terminals for connection to electrical conductors. In use, the rind 6 may be removed from as much of the terminal section 8 as is necessary or desirable to permit the fully exposed core to be metalized and an electrical conductor to be electrically connected, or the rind can be left on and the upper, exposed surface of the core can be metalized or otherwise made receptive to electrical connection.

Referring now to FIG. 4, a shape 1 of this invention, with a multiplicity of closely-spaced reaches is shown mounted with the aid of an inorganic high temperature adhesive 11 in a supporting bed of high temperature refractory material 12, such as zirconium oxide, magnesium oxide, alumina or the like, covered with a relatively thin coating of refractory 13 such as zirconium oxide, magnesium oxide, alumina or the like, which in turn is covered with a crystallizable glass plate 14, such as is commercially available under the trademark HERCUVIT, a product of PPG Industries, Inc. Such a "laminated" device can be used as a burner for one of the new countertop domestic ranges, for example, the Hercuvit plate extending beyond the element to form the top of the range. This example is merely illustrative of a possible means for using the heating element as a burner.

The element 1 is coherent and self-supporting. It is somewhat brittle, and must therefore be protected against mechanical distortion and shock, but it is extremely resistant to thermal shock. The shapes, used as heating elements can be operated up to 2,800° F.

Unlike the elements formed by the prior art systems, in which the heating element resistance from one element to another may vary by plus or minus 100 percent, the preferred, laser-formed elements of this invention appear to vary no more than about plus or minus 20 percent. With proper feedback techniques, this control can be even more accurate.

In the preferred embodiment of method of making the element 1, a 3 inch deep bed of 320 mesh, aluminum doped silicon carbide (Carborundum silicon carbide grains and powders, black), with a particle size of approximately 25 microns, is formed by pouring the commercial powder into a box and leveling the top surface, as indicated by the reference numeral 20. The box containing the bed is then placed on an $x$–$y$ table, under a laser. The $x$–$y$ table is programmed to move, in the illustrative embodiment shown, in a path coinciding with the long axis of the reaches of the element 1 shown in FIG. 3.

The laser in this illustrative embodiment is a carbon dioxide laser producing energy at a wave length of 10.6 microns, operating at 300 watts CW with a lens which gives a broad depth of focus and a spot about 0.08 inches in diameter. The laser oriented so that the laser beam strikes the surface of the bed perpendicularly. The beam and bed, in forming the shape shown in FIG. 3 are moved relative to one another from one end at a speed of about half an inch per minute until an enlarged terminal section 8 is formed, whereupon the speed is increased to about one inch per minute, through the length of the element and in the pattern shown, until the beam and bed have reached the point at which the other terminal section 8 is to be formed, whereupon the relative motion is slowed to about half an inch per minute to form the second terminal section.

In using a laser to produce the silicon carbide element, the beam must be of a wave length which is readily absorbed by silicon carbide. While other lasing materials will give differing results which will be a function of the match between the laser beam wave length and the silicon carbide absorption wave length, the 10.6 micron wave length of the carbon dioxide laser has been found to be quite satisfactory.

The shape, with core 5 and rind 6, can simply be lifted from the bed, fully formed. Loose powder can be brushed off, and as much of the rind removed as desired, as has been indicated. The rind does provide a built in thermal and electrical insulating layer, and is therefore quite useful in many applications. The exposed terminal parts of the core can be metalized or otherwise made receptive to electrical connection, and the element is ready for mounting as a heating element.

It has been found that by varying the relative speed of the beam and bed between about 0.5 inches per minute and 30 inches per minute, elements with cores having a resistance of about 0.05 ohms per linear inch to 100 ohms per linear inch are produced, with the preferred grit sizes, as is discussed hereinafter, using commercially available silicon carbide powders. The aluminum doped commercial silicon carbide is reported to contain in the neighborhood of 0.34 percent aluminum.

It has also been found that the grit sizes are of considerable importance. 800 grit commercial aluminum doped silicon carbide powder with a maximum particle size of about 30 microns, a minimum particle size of about 5 microns, and an average size of about 12 microns, produces, with a carbon dioxide laser operated at 250–300 watts CW, a .05–.08 inch diameter spot, and varying relative speeds, shapes or poor coherence, unsuitable for use as a heating element. 500 grit commercial aluminum doped silicon carbide powder, with a maximum size of about 40 microns, a minimum size of about 10 microns, and an average size of 19 microns, produces an excellent heating element, with a sharp line of demarcation between the high resistivity rind and the low resistivity core. Made at a relative speed of 1 inch per minute, with a laser operated at 300 watts CW and a beam of 0.05 inch spot size, the core has a resistivity of 0.19 ohms per linear inch.

240 grit commercial doped powder, with a maximum size of about 85 microns, a minimum size of about 25 microns and an average size of about 50 microns, produces, with a laser operated at 300 watts CW, with a beam of 0.05 inch spot size and a table speed of one inch per minute, a heating element with a core resistivity of 0.14 ohms per linear inch. The demarcation between the low resistance rind and the high resistance core is not as clearly defined as it is in the element made with 500 grit powder, although it is still delineated.

Under the same conditions of formation, 80 grit commercial aluminum doped powder, with a maximum particle size of about 292 microns, a minimum of about 102 microns, and an average of about 165 microns, produces a heating element which is irregular in cross-section and lacks strength as compared with the elements made of 240 grit material. The line of demarcation between the core and rind is not well defined. The element has a resistivity of 0.18 ohms per linear inch. The 80 grit particle size requires more than 300 watts CW from a carbon dioxide laser with the 0.05 inch spot size in order to be uniform in cross-section at the 1 inch per minute table speed. A higher-power carbon dioxide laser would form larger cross-section silicon carbide heating elements from the 80 grit silicon carbide particles thereby making this size useful. However, because present commercially available "off-the-shelf" lasers are limited to about 300 watts, the 80 grit silicon carbide material is too large for optimum results with commonly available lasers.

The electrical resistance per unit of length for an element of given cross-section is largely set by the resistivity of the starting silicon carbide. Heavily doped silicon carbide particles will give a lower resistance per unit length in the resulting heating element than lightly doped silicon carbide particles. However, commercially, the aluminum doped silicon carbide powder is heavily doped, and the resulting heating element has low resistance per unit length. This heavy doping also results in a positive temperature coefficient and stability during high temperature operation. Heating elements made using the 240 grit silicon carbide particles had a positive temperature coefficient of resistance of 250 parts per million per degree Fahrenheit at 2,000° F. operating temperature. The resistance of the rind in any event is on the order of above $10^6$ ohms/inch at room temperature.

The heating elements produced by a laser beam under the conditions described above have been made in widths from less than one-eighth inch to as much as three-eighth inch at the top, depending upon the dwell time. The resistance of such elements, made from 320 mesh powder, a laser operated at 250 watts CW and a spot size of about 0.08 inch in diameter, has varied from 0.5 ohms per linear inch to 100 ohms per linear inch. The width can be changed by simply changing the table speed. By making the element wide at the terminals, it is possible to use aluminum, which melts at about 1,300° F. for contacts on heating elements which are expected to heat to 2,800° F. in their hottest portions. There appears to be a practical limit to the minimum cross-sectional area of an element. This minimum cross-section would be set by mechanical strength considerations of the heating element. The larger cross-sectional areas tend to be much stronger than the smaller cross-sectional areas. The maximum cross-sectional area depends not only on the dwell time of the laser beam, which is limited by the maximum temperature to which the particles of silicon carbide can be raised without decomposition or sublimation, but also by the energy of the beam. A laser operating at 500 watts CW can be expected to produce a wider element, of greater cross-sectional area, than a laser operating at 250 watts CW with the same table speeds or dwell times. The higher power, with the same dwell time, will dictate the use of larger particle sizes. Thus, while it would appear that the lowest average particle size to produce a practical heating element with a carbon dioxide laser beam is larger than 12 microns, the largest useful average particle size will depend upon the power of the laser.

The method of forming silicon carbide shapes which has been discribed above, is simple, extremely versatile and permits an almost infinite variety of shapes to be produced, which can either have a top surface lying substantially in a single plane, or by contouring the exposed surface of the bed, can even be contoured in other dimensions.

However, while they are neither as flexible nor as inexpensive nor as satisfactory, other methods of producing silicon carbide elements, within the scope of this invention and the accompanying claims, are available. The effect of the laser beam on the silicon carbide is to raise the particles very rapidly to a temperature above 3,000° F. and preferably above 4,000° F. but below 5,500° F. and then to permit them to cool off rapidly to a temperature below 3,000° F. In order to practice the present invention, heat-up times of less than 1 hour, and, for practical purposes, less than 30 minutes, are necessary to prevent the silicon carbide particles from breaking down in air to form silicon dioxide and carbon monoxide. The laser provides heat-up times of less than 1 minute, and cool-off times to below the critical temperature of about 3,000° F. of less than 1 minute. In most instances, the entire cycle occupies only a matter of a few (e.g., 10) seconds. It is for this reason, among others, that the laser beam method is unique and extraordinarily effective.

By way of example of other methods, a rod of 320 mesh silicon carbide powder is rapidly heated and cooled in an argon atmosphere, using an induction heater. The energy is coupled from the induction heater to the silicon carbide rod by placing the silicon carbide rod inside a carbon tube. The rod reaches temperatures approaching 5,000° F. during a fifteen minute heating interval reckoned from the time the rod temperature reaches 3,000° F. and is cooled within a similar period, making the cycle from below 3,000° to 5,000° F. and back complete within thirty minutes. A usable heating element is formed.

A heating element can also be produced from 320 mesh silicon carbide powder by placing a thin carbon strip on the powder and heating up the strip in an argon atmosphere, using two carbon electrodes at opposite ends of the strip in electrical contact with the carbon strip. The carbon strip is heated to white heat in what appears to be more of an arcing process than a strip heating process, and again cooled, the complete cycle requiring less than 30 minutes. The silicon carbide powder forms a coherent heater element.

Other possible power sources are solar furnaces and focused infrared sources. The ultimate requirement is to produce a localized temperature above 3,000° F. and below 5,500° F. and to cool the particles, or rather the resultant shape, below 3,000 F., all in a relatively short time, viz., thirty minutes in air. A longer period of time can be tolerated in an inert, e.g., argon, atmosphere. It is to be noted that in this process a nitrogen atmosphere is not inert. The preferred range of particle sizes in any of the methods is greater than 10 microns and less than 300 microns.

Numerous variations in the shapes and methods of this invention, within the scope of the appended claims, will occur to those skilled in the art in the light of the foregoing disclosure. For example, although the laser beam in the preferred embodiment was described as impinging upon the surface of the bed perpendicularly, the beam can be oriented at an angle, if desired. N-dopant silicon carbide powder can be used, depending upon the use to which the resultant shapes are to be put. The structure and the method of making it remain the same whether the silicon carbide power is doped with a P-dopant or N-dopant. These variations are merely illustrative.

Having thus described the invention, what is claimed and desired to be secured by Letters Patent is:

1. A method of forming a coherent shape of silicon carbide comprising the steps of heating unconsolidated particulate silicon carbide to a temperature above 3,000° F. and below 5,500° F. and subsequently cooling the silicon carbide below 3,000° F., both steps being completed within a period of 30 minutes.

2. A method of forming a coherent shape of silicon carbide comprising the steps of selectively heating unconsolidated particulate silicon carbide by means of an uncharged energy beam to a temperature above 3,000° F. and below 5,500° F. and subsequently cooling the silicon carbide below 3,000° F., both steps being completed within a period of 10 minutes.

3. A method of forming a coherent shape of silicon carbide comprising sequentially exposing particulate silicon carbide to the energy of a laser beam for a period of less than 10 minutes, said particulate silicon carbide being heated by said laser beam to a temperature above 3,000° F. and below 5,500° F. within said period and thereafter cooled below 3,000° F.

4. A method of forming a coherent shape of silicon carbide comprising exposing particulate silicon carbide to the energy of a laser beam for a period of less than ten minutes, said laser beam being emitted by a carbon dioxide laser and having a wave length of approximately 10.6 microns, and the particulate silicon carbide having particle sizes greater than ten microns.

5. The method of claim 4 wherein the laser beam and a bed of particulate silicon carbide are moved relative to one another at a rate such that none of the silicon carbide particles is exposed to said beam more than 30 seconds.

6. The method of claim 3 wherein the particulate silicon carbide is exposed to the laser beam in an air atmosphere at atmospheric pressure.

7. The method of claim 3 wherein the particulate silicon carbide is doped to make it semiconductive.

8. The method of claim 7 wherein the dopant is aluminum.

9. A method of forming a coherent shape of silicon carbide comprising directing onto unconsolidated particulate silicon carbide a laser beam with energy sufficient to raise the temperature of said particulate silicon carbide above 3,000° F. and below 5,500° F., moving the particulate silicon carbide and laser beam with respect to one another and controlling the rate of said movement to cause said particulate silicon carbide to heat between 3,000° and 5,500° F. and to be removed from an area of impingement by said laser beam in a period of less than 20 seconds.

10. A method of forming a silicon carbide heating element comprising forming a bed of particulate P-doped silicon carbide, directing a laser beam onto the surface of said bed to cause particulate silicon carbide upon which the beam is directed to heat to a temperature above 3,000° F. and below 5,500° F., moving said bed and beam relative to one another in a predetermined, element-shaped pattern, heating the particles at the ends of the element to a greater degree than the particles intermediate the ends, the rate of relative movement of the two being such as to cause the particles to heat above 3,000° F. and cool below 3,000° F. all in a time span of less than 10 minutes.

11. The method of claim 10 wherein the bed is exposed to air during the element forming process, and the rate of relative movement is such as to produce a heating cycle time of less than 30 seconds.

* * * * *

UNITED STATES PATENT OFFICE
CERTIFICATE OF CORRECTION

Patent No. 3,764,776             Dated   October 9, 1973

Inventor(s) Frank J. Hierholzer and John A. Ancona

It is certified that error appears in the above-identified patent and that said Letters Patent are hereby corrected as shown below:

Col. 3, line 17, after "laser" insert ---is---;

Col. 4, line 6, after "commercial" insert ---aluminum---;

Col. 5, lines 19-20, "powder" should be ---power---;

Col. 6, line 34, "30" should be ---10---.

Signed and sealed this 5th day of February 1974.

(SEAL)
Attest:

EDWARD M. FLETCHER, JR.　　　　RENE D. TEGTMEYER
Attesting Officer　　　　　　　Acting Commissioner of Patents